US011265634B1

(12) United States Patent
Beauregard et al.

(10) Patent No.: US 11,265,634 B1
(45) Date of Patent: Mar. 1, 2022

(54) ARTICULATED VEHICLE SPEAKER SYSTEM (71) Applicant: JVIS-USA, LLC, Shelby Township, MI (US)

(72) Inventors: Marc Beauregard, Berkley, MI (US); Alaa Alsamak, Shelby Township, MI (US); Remon Jiddou, Sterling Heights, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 0 days.

(21) Appl. No.: 17/086,229

(22) Filed: Oct. 30, 2020

(51) Int. Cl.
| | |
|---|---|
| *H04R 1/02* | (2006.01) |
| *B60R 11/02* | (2006.01) |
| *H04R 31/00* | (2006.01) |
| *H04R 1/40* | (2006.01) |
| *F16C 3/02* | (2006.01) |
| *F21V 33/00* | (2006.01) |
| *H02K 7/116* | (2006.01) |
| *F21W 104/00* | (2018.01) |

(52) U.S. Cl.
CPC .......... *H04R 1/026* (2013.01); *B60R 11/0217* (2013.01); *F16C 3/02* (2013.01); *F21V 33/0056* (2013.01); *H04R 1/025* (2013.01); *H04R 1/403* (2013.01); *H04R 31/006* (2013.01); *F21W 2104/00* (2018.01); *H02K 7/116* (2013.01); *H04R 2201/025* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 5,094,316 | A | 3/1992 | Rosen |
| 5,532,437 | A | 7/1996 | Simplicean et al. |
| 5,646,381 | A | 7/1997 | Boyte, Jr. |
| 5,979,590 | A | 11/1999 | Telmos |
| 6,076,885 | A | 6/2000 | Curtindale et al. |
| D469,421 | S | 1/2003 | Stickles et al. |
| 6,690,802 | B2 | 2/2004 | Stickles et al. |
| 7,984,738 | B2 | 7/2011 | LaMarca et al. |
| 9,462,385 | B2 | 10/2016 | Perez et al. |
| 9,913,014 | B2 | 3/2018 | Perez et al. |

(Continued)

*Primary Examiner* — Kenny H Truong
(74) *Attorney, Agent, or Firm* — Brooks Kushman P.C.

(57) ABSTRACT

An articulated vehicle speaker system includes a vehicle mount adapted to be mounted on a vehicle and a speaker assembly including front and back injection molded panels which, when joined together, define a speaker compartment at first and second ends of the panels to house a speaker unit and a central compartment which separates the speaker compartments. A pair of spaced, powered hinge assemblies are disposed within the central compartment and hingedly connect the speaker assembly to the vehicle mount to allow limited swinging movement of the speaker assembly between different positions on the vehicle. Each hinge assembly includes a bidirectional, electrically-powered actuator and transmission subassembly. Each subassembly including a rotary output shaft and a set of interconnected transmission elements coupled to the output shaft and to the speaker assembly to automatically swing the speaker assembly based on a command signal.

12 Claims, 8 Drawing Sheets

(56) References Cited

U.S. PATENT DOCUMENTS

| | | |
|---|---|---|
| 10,142,716 B2 | 11/2018 | Perez et al. |
| 10,499,130 B2 | 12/2019 | Perez et al. |
| 2003/0076964 A1* | 4/2003 | Stickles ................ H04R 27/00 381/86 |
| 2009/0314770 A1 | 12/2009 | LaMarca et al. |
| 2010/0072742 A1 | 3/2010 | LaMarca et al. |
| 2020/0107090 A1 | 4/2020 | Perez et al. |

* cited by examiner

ARTICULATED VEHICLE SPEAKER SYSTEM

TECHNICAL FIELD

This invention generally relates to sound or speaker systems and, in particular, to articulated, vehicle sound or speaker systems such as articulated sound bar assemblies having a plurality of speaker units.

Overview

Speaker systems or devices configured to transmit audible sound are known to be constructed in various configurations. All speaker devices have some form of transducing device typically mounted in a chassis or enclosure.

One role of the enclosure is to prevent sound waves generated by the rearward-facing surface of the diaphragm of an open driver from interacting with sound waves generated at the front of the driver. Because the forward- and rearward-generated sounds are out of phase with each other, any interaction between the two in the listening space creates a distortion of the original signal as it was intended to be reproduced. Additionally, because they travel different paths through the listening space, the sound waves arrive at the listener's position at slightly different times, introducing echo and reverberation effects not part of the original sound.

The enclosure also plays a role in managing vibration induced by the driver frame and moving airmass.

Speaker systems are also known to include multiple speakers some of which are selected to broadcast in particular frequency ranges. That is, it is known that audible sound occurs primarily in a frequency range from about 20 cycles per second to about 20,000 cycles per second. Those skilled in the art will recognize that to get better quality sound, the speakers (transducing devices) are typically constructed to produce sound in different ranges. Thus, transducing speakers can be constructed in a variety of ways to broadcast sound in different ranges which vary based on the transducing speaker, cost, space, audience, and the like. Some transducing speakers are referred to as a mid-range, high frequency (HF), low frequency or bass and the like. The exact frequency range will vary based on a variety of factors. However, low frequency or bass speakers typically produce sound from about 40 to 60 hertz (Hz) to about 450 to 500 Hz; mid-range speakers produce sound from around 70 Hz to 100 Hz to about 3000 Hz, and HF speakers typically produce sound from around 3000 Hz to 3500 Hz to above 20,000 Hz. In other words, while the frequency range for bass, mid-range and HF differ, they may and typically do overlap.

High performance automotive speakers are often mounted within plastic speaker enclosures such that sound waves radiating from the front of the speaker diaphragm enter the passenger compartment of the vehicle while sound waves emanating from the back of the speaker diaphragm enter the enclosure. For an automotive speaker to deliver accurate sound reproduction, especially in the low frequency ranges, it is important that the speaker enclosure be rigid enough to resist vibrating in response to the motion of the vehicle and the sound waves generated by the back of the speaker diaphragm. This rigidity requirement represents a significant design challenge in the manufacture of light weight, low cost speaker enclosures. Whereas thin-walled enclosures are desirable from a cost and weight standpoint, care must be taken to ensure that the enclosure walls are adequately reinforced against vibration so that the sound quality of the system is not compromised.

Many conventional automotive speaker enclosures are made from injection molded plastic material. The injection molding process allows the thickness of the enclosure walls to be varied such that thicker wall sections may be provided in areas of the enclosure that would otherwise be susceptible to vibration.

Despite the design flexibility offered by injection molding, however, the method has several drawbacks with respect to speaker enclosure manufacture. For example, it is difficult to ensure an airtight seal between the enclosure pieces because of part shrinkage, part twisting, and the irregular complex, 3-D shapes of many speaker enclosure designs. In the absence of an airtight seal between the pieces, the speaker enclosure will not function as intended.

U.S. Pat. No. 5,532,437 discloses a speaker assembly for a motor vehicle in which a single speaker is mounted to a blow molded enclosure.

Speaker boxes including multiple speakers are commonly mounted to the sports bar of sport utility vehicles to provide music and other audio entertainment for the driver and passengers. Such speaker boxes are typically mounted to extend across the sports bar in a horizontal position. One problem of blow molded speaker boxes is that it is difficult, if not impossible, to manufacture internal features in such enclosures to isolate or acoustically decouple the compartments in which the various speakers are mounted, especially if the speakers are located some distance from each other.

The following U.S. patent documents are related to at least one embodiment of the present invention: U.S. Pat. Nos. 5,094,316; 5,532,437; 5,646,381; 5,979,590; 6,076,885; 6,690,802; 7,984,738; 2009/0314770; 2010/0072742; and D469421.

The following U.S. patent documents, owned by the assignee of the present application, are also related to at least one embodiment of the present invention: 10,499,130; 10,142,716; 9,913,014; 9,462,385 and 2020/0107090.

Despite the prior art noted above, there is a need for a low cost, compact speaker system such as a sound bar assembly capable of automatically deploying from a first position to a second position on a vehicle.

The term "bus" and variations thereof, as used herein, refers to a subsystem that transfers information and/or data and/or power between various components. A bus generally refers to the communication hardware interface, interconnects, bus architecture, and/or protocol defining the communication scheme for a communication system and/or communication network. A bus may also be specifically referred to as a part of communication hardware that interfaces the communication hardware with the interconnects that connect to other components of a corresponding communication network. The bus may be for a wired network, such as a physical bus, or wireless network, such as part of an antenna or hardware that couples the communication hardware with the antenna. A bus architecture supports a defined format in which information sand/or data is arranged when sent and received through a communication network. A protocol may define the format and rules of communication of a bus architecture.

The term "vehicle," as used herein, includes any conveyance, or model of a conveyance, where the conveyance was originally designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

SUMMARY

An object of at least one embodiment of the present invention is to provide a light weight, thin-walled, compact, vehicle speaker system such as sound bar assembly having improved sound quality, is capable of being manufactured at high production rates for markets such as the sport utility vehicle market, and is capable of automatically deploying from a first position to a second position on a vehicle.

In carrying out the above object and other objects of at least one embodiment of the present invention, an articulated vehicle speaker system is provided. The system includes a vehicle mount adapted to be mounted on a vehicle and a speaker assembly including front and back injection molded panels which, when joined together, define a speaker compartment at first and second ends of the panels to house a speaker unit and a central compartment which separates the speaker compartments. The system also includes a pair of spaced, powered hinge assemblies disposed within the central compartment to hingedly connect the speaker assembly to the vehicle mount to allow limited swinging movement of the speaker assembly between first and second positions on the vehicle. Each hinge assembly includes a bidirectional, electrically-powered actuator and transmission subassembly. Each actuator and transmission subassembly includes a rotary output shaft and a set of interconnected transmission elements coupled to the output shaft and to the speaker assembly to automatically swing the speaker assembly upon rotation of its output shaft in a first direction from the first position to the second position based on a command signal.

Each set of interconnected transmission elements may comprise a set of gears coupled to its output shaft to rotate therewith.

Each hinge assembly may include a pair of spaced apart gears mounted on the output shaft to rotate therewith in meshing engagement with a pair of toothed guide members fixedly connected to the vehicle mount to guide movement of the speaker assembly.

Each hinge assembly may comprise a geared hinge assembly.

The vehicle may be a sport utility vehicle wherein the system may be an overhead sound bar assembly.

Each actuator and transmission subassembly may include a DC motor responsive to the command signal.

Further in carrying out the above object and other objects of at least one embodiment of the present invention, an articulated vehicle speaker system having a plurality of speaker units is provided. The system includes a vehicle mount adapted to be mounted on a vehicle and a speaker assembly including front and back injection molded panels which, when joined together, define a speaker compartment at first and second ends of the panels and a central compartment which separates the speaker compartments. The front panel has a first sound opening at the first end and a second sound opening at the second end. The system also includes a first speaker unit disposed in the first speaker compartment and mounted to transmit sound through the first sound opening and a second speaker unit disposed in the second speaker compartment and mounted to transmit sound through the second sound opening. Finally, the system includes a pair of spaced, powered hinge assemblies disposed within the central compartment to hingedly connect the speaker assembly to the vehicle mount to allow limited swinging movement of the speaker assembly between first and second positions on the vehicle. Each hinge assembly includes a bidirectional, electrically-powered actuator and transmission subassembly. Each actuator and transmission subassembly includes a rotary output shaft and a set of interconnected transmission elements coupled to the output shaft and to the speaker assembly to automatically swing the speaker assembly upon rotation of its output shaft in a first direction from the first position to the second position based on a command signal.

Each set of interconnected transmission elements may comprise a set of gears coupled to its output shaft to rotate therewith.

Each hinge assembly may include a pair of spaced apart gears mounted on the output shaft to rotate therewith in meshing engagement with a pair of toothed guide members fixedly connected to the vehicle mount to guide movement of the speaker assembly.

Each hinge assembly may comprise a geared hinge assembly.

The vehicle may be a sport utility vehicle wherein the system may be an overhead sound bar assembly.

Each actuator and transmission subassembly may include a DC motor responsive to the command signal.

Still further in carrying out the above object and other objects of at least one embodiment of the present invention, an articulated vehicle speaker system having one or more lighting units is provided. The system includes a vehicle mount adapted to be mounted on a vehicle and a speaker assembly including front and back injection molded panels which, when joined together, define a speaker compartment at first and second ends of the panels to house a speaker unit, a central compartment which separates the speaker compartments and a light compartment between the first and second ends. A light unit is positioned in the light compartment to emit light through the speaker assembly. A pair of spaced, powered hinge assemblies are disposed within the central compartment to hingedly connect the speaker assembly to the vehicle mount to allow limited swinging movement of the speaker assembly between first and second positions on the vehicle. Each hinge assembly includes a bidirectional, electrically-powered actuator and transmission subassembly. Each actuator and transmission subassembly includes a rotary output shaft and a set of interconnected transmission elements coupled to the output shaft and to the speaker assembly to automatically swing the speaker assembly upon rotation of its output shaft in a first direction from the first position to the second position based on a command signal.

Each set of interconnected transmission elements may comprise a set of gears coupled to its output shaft to rotate therewith.

Each hinge assembly may include a pair of spaced apart gears mounted on the output shaft to rotate therewith in meshing engagement with a pair of toothed guide members fixedly connected to the vehicle mount to guide movement of the speaker assembly.

Each hinge assembly may comprise a geared hinge assembly.

The vehicle may be a sport utility vehicle wherein the system may be an overhead sound bar assembly.

Each actuator and transmission subassembly may include a DC motor responsive to the command signal.

The light unit may comprise an elongated light bar which extends between the first and second ends.

The panels may define a plurality of light compartments wherein the system may include a light unit positioned in each of the light compartments.

DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
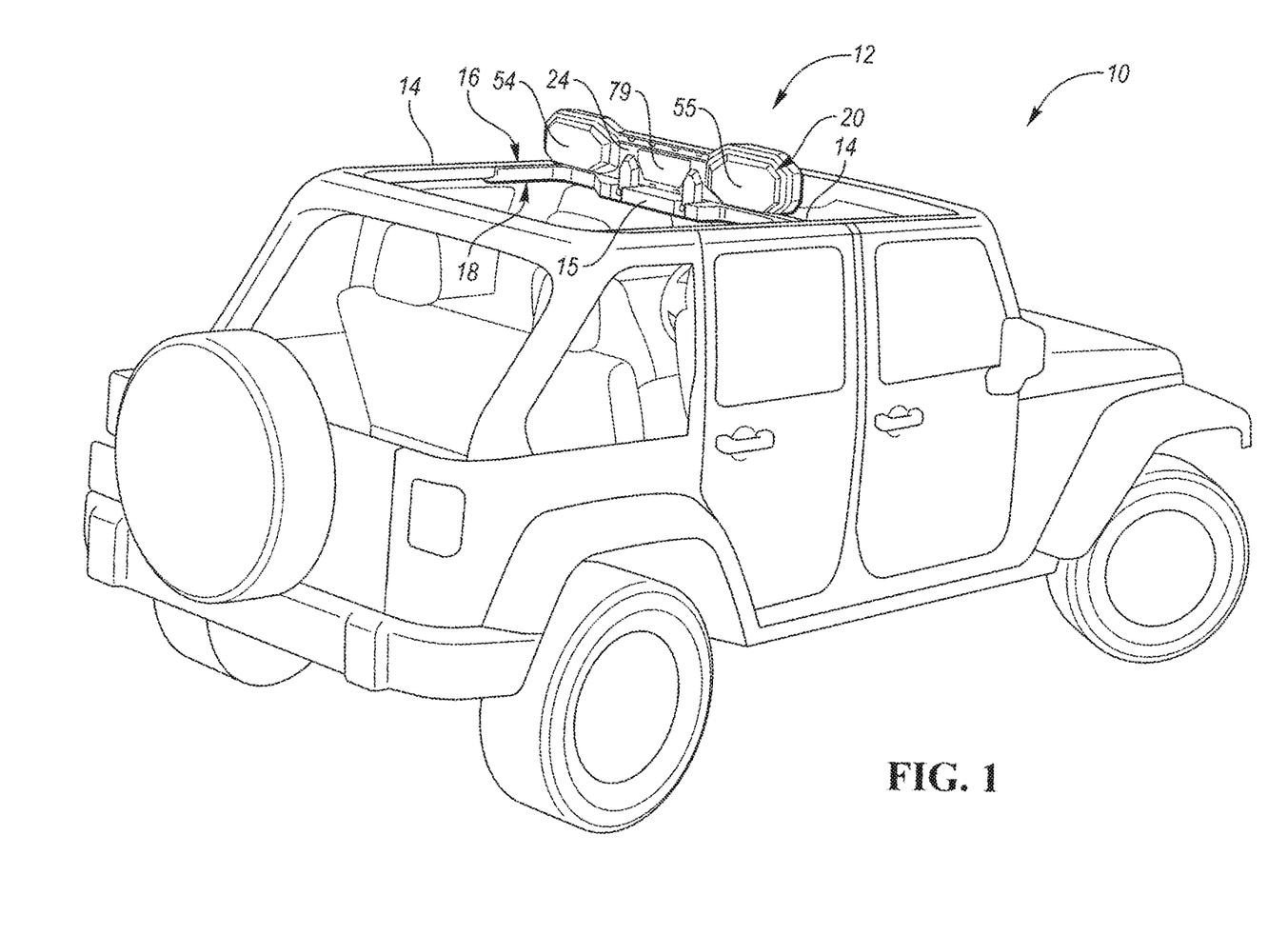
FIG. 1 is an environmental view of a sport utility vehicle having a speaker system or sound bar assembly constructed in accordance with at least one embodiment of the present invention.

Referring now to FIG. 1, a sport utility vehicle generally indicated at 10, has a sound bar assembly or speaker system, generally indicated at 12, mounted on a pair of spaced horizontal rails 14 of the vehicle 10 above the passenger compartment of the vehicle 10. The sound bar assembly 12 extends laterally across substantially the entire width of the vehicle 10. The assembly 12 includes a vehicle mount, generally indicated at 16 in the drawing figures, which is configured or adapted to be mounted in the vehicle to, in turn, mount the rest of the assembly 12 to the rails 14 of the vehicle 10. A plurality of covering panels 15 cover different sections of the mount 16 and a plastic mounting cover, generally indicated at 18. The vehicle mount 16 also preferably includes apertures 17 which are aligned with apertures 19 formed in the mounting cover 18. The aligned apertures 17 and 19 provide attachment locations to the rails 14 by bolts 21 which extend through the apertures 17 and 19. The plastic mounting cover 18 is sandwiched between the vehicle rails 14 and the mount 16.

Figure 6:
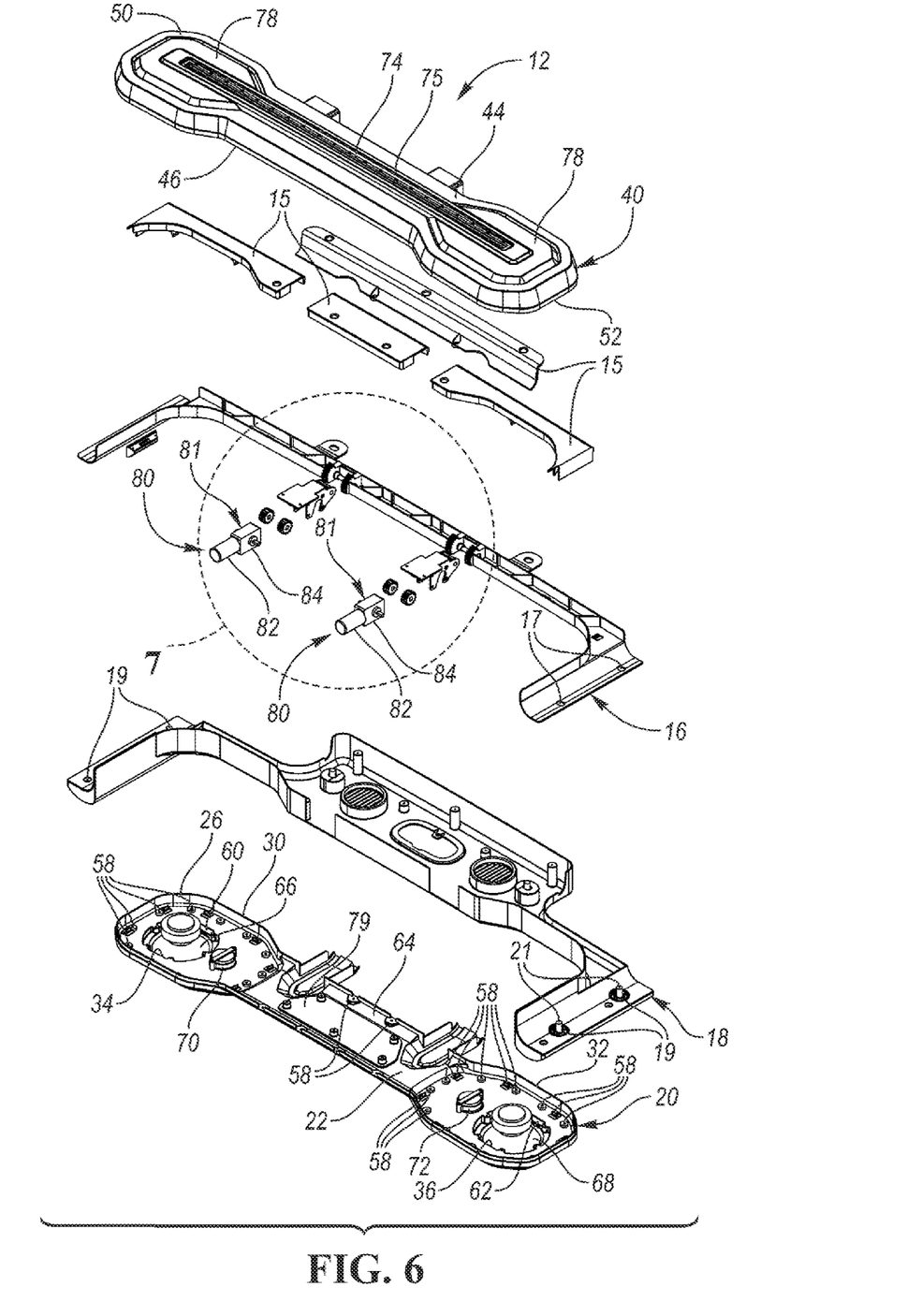
FIG. 6 is an exploded perspective view of the system or assembly of FIGS. 2-5 with speaker and light units.
Figure 8:
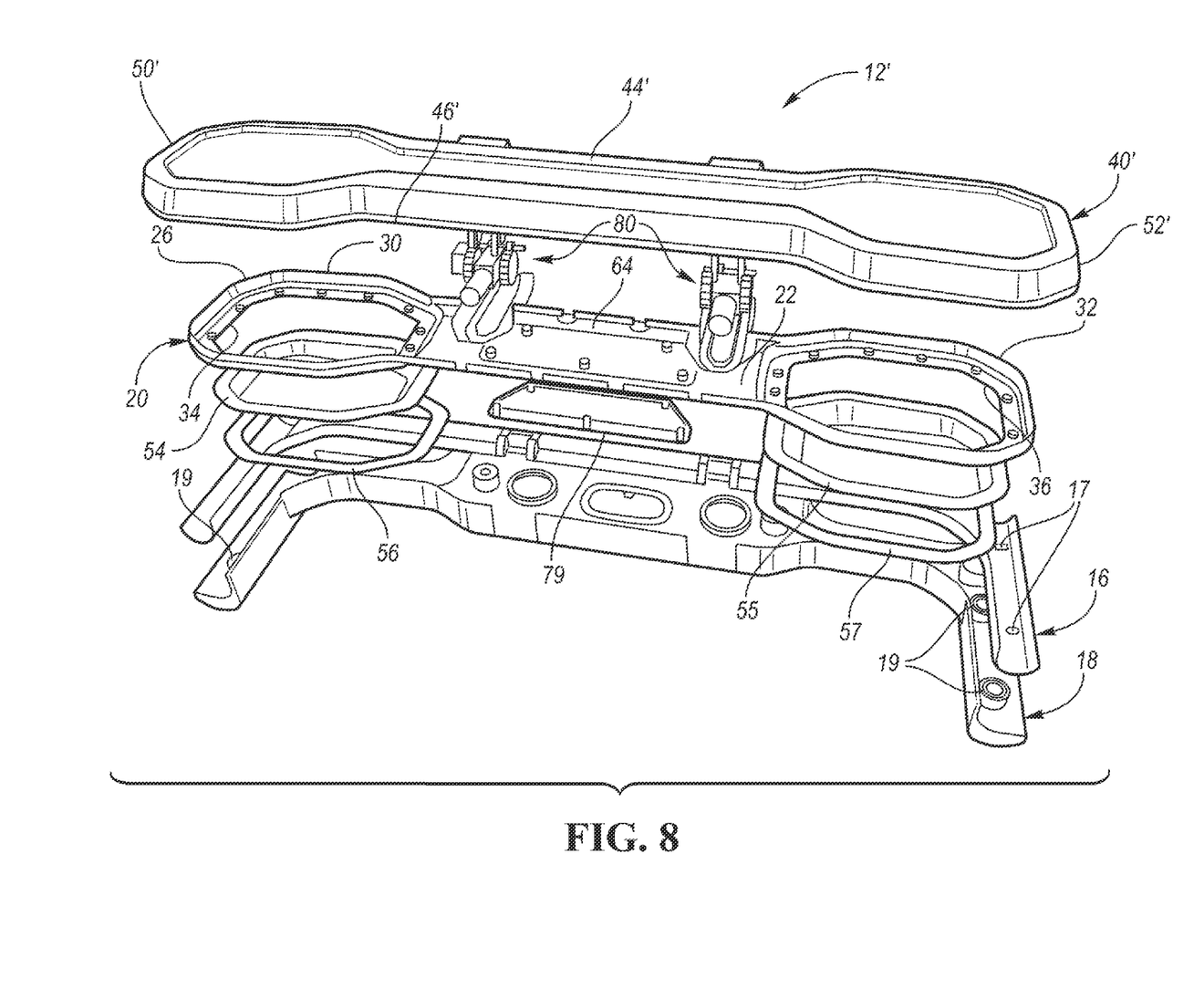
FIG. 8 is an exploded perspective view of an articulated speaker or sound bar system constructed in accordance with a different embodiment of the present invention (i.e. without light units)
Figure 9:
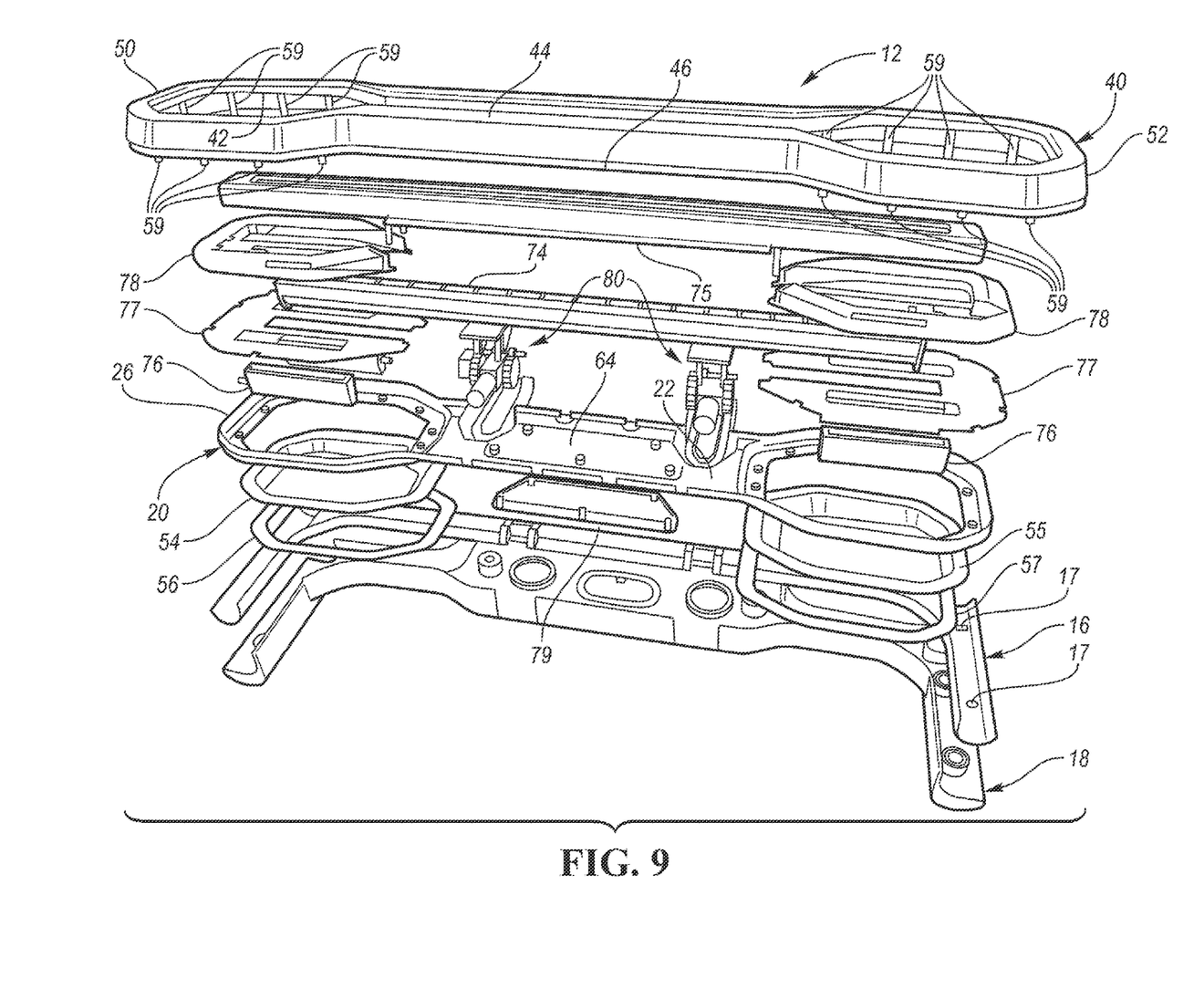
FIG. 9 is an exploded perspective view of an articulated speaker or sound bar assembly constructed in accordance with at least one embodiment of the present invention without speakers but with light units.

As best shown in the exploded perspective views of FIGS. 6, 8 and 9, the system or assembly 12 (12' in FIG. 8 since FIG. 8 is a different embodiment—one without light units) includes an elongated speaker housing or front panel, generally indicated at 20, having inner and outer surfaces 22 and 24, respectively, and an outer boundary mating portion 26 formed about the perimeter of the front panel 20. The front panel 20 has a first sound opening 34 at a first end 30 and a second sound opening 36 at a second end 32 of the front panel 20. The outer surface 24 is typically a class-A surface.

Figure 2:
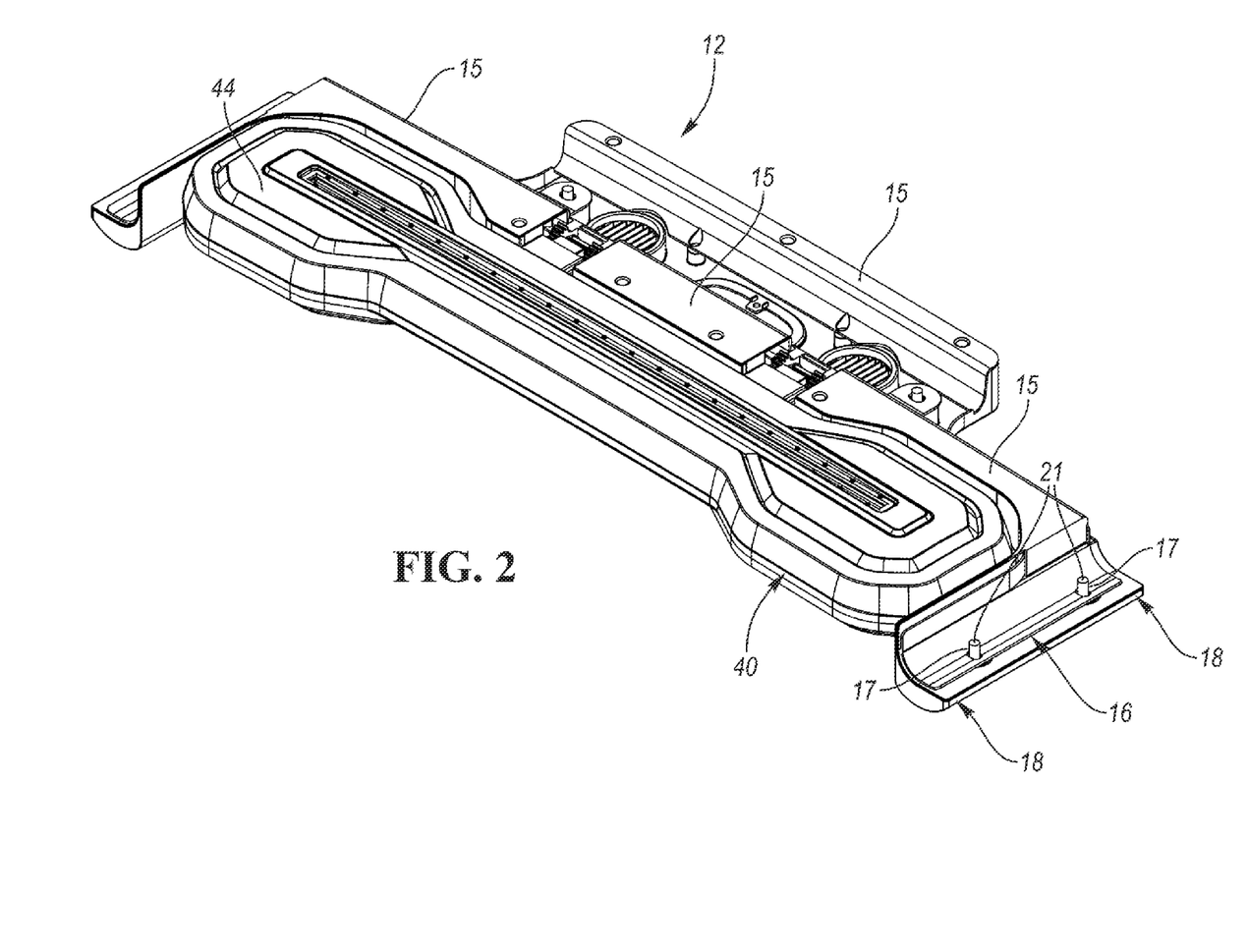
FIG. 2 is a top perspective view of a speaker system or sound bar assembly in its folded position and constructed in accordance with at least one embodiment of the present invention.
Figure 4:
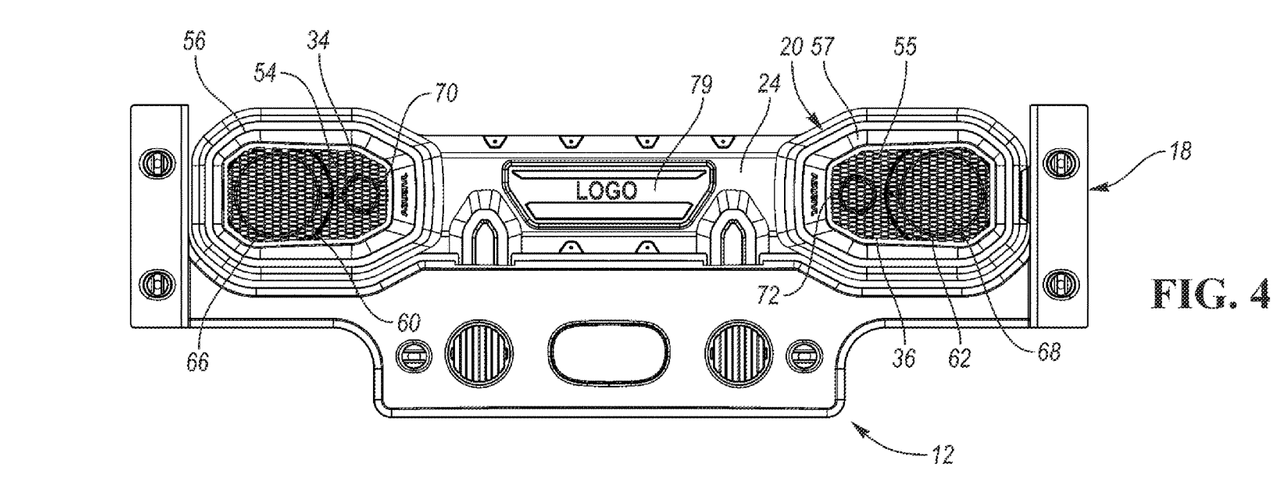
FIG. 4 is a bottom view of the system or assembly of FIGS. 2 and 3 in its folded position.
Figure 5:
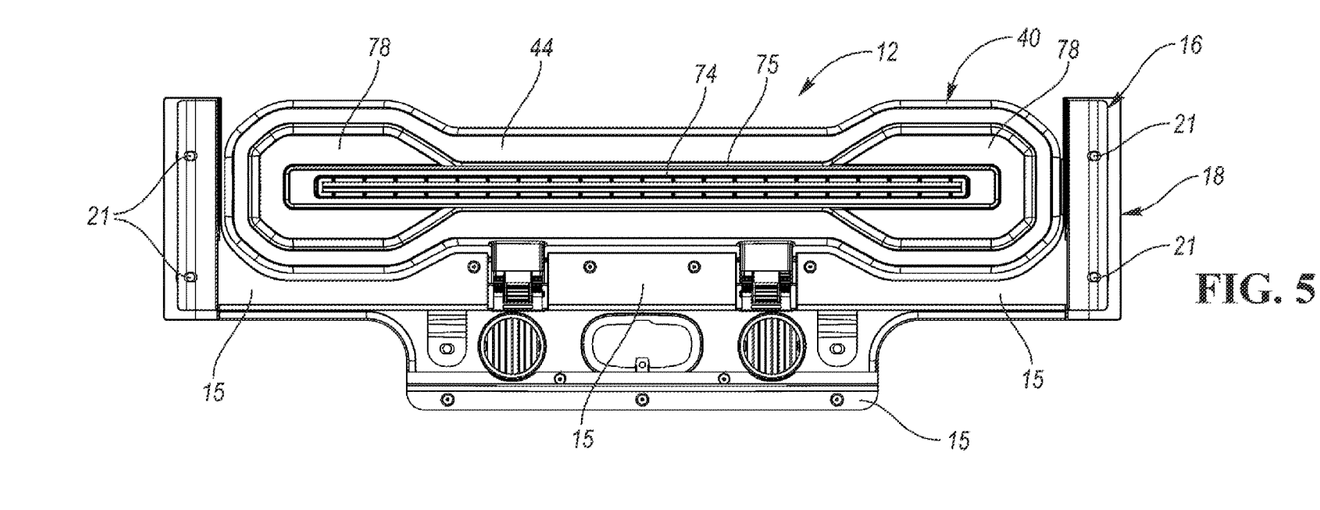
FIG. 5 is a top plan view of the system or assembly of FIGS. 2-4 in its folded position.

Still referring to FIGS. 6, 8 and 9 and also to FIGS. 2 and 5, the system or assembly 12 also includes an elongated upper housing or back panel, generally included at 40, having inner and outer surfaces, 42 (FIG. 9) and 44 (44' in FIG. 8), respectively, and an outer boundary mating portion 46 (46' in FIG. 8) that opposes the corresponding mating portion 26 of the front panel 20. The outer boundary mating portion 46 is formed about the perimeter of the back panel 40. The back panel 40 also includes first and second ends 50 and 52 (50' and 52' in FIG. 8). The front and back panels 20 and 40, respectively, are spaced apart at their first and second ends 30, 32, 50 and 52 to define first and second speaker compartments 60 and 62 (FIGS. 3 and 4), respectively, separated by a central compartment 64 (FIGS. 6, 8 and 9).

The assembly 12 also includes a pair of speaker gills, 54 and 55 which cover or enclose the speaker compartments 60 and 62, respectively. Speaker rings 56 and 57 secure the speaker grills 54 and 55, respectively, at the ends 30 and 32, respectively, of the front panel 20.

Figure 3:
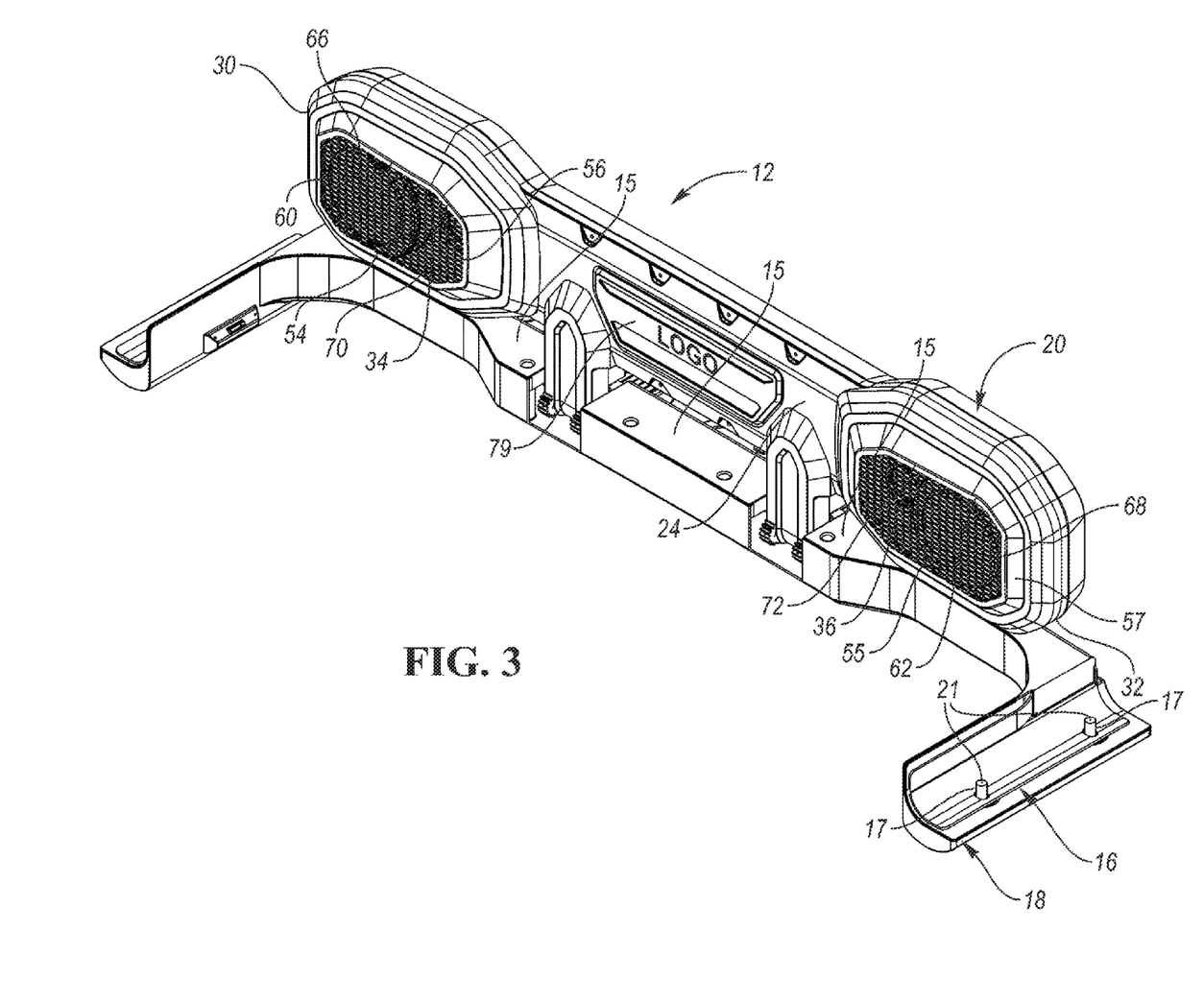
FIG. 3 is a top perspective view of the speaker system or assembly of FIG. 2 in its unfolded position.

As shown in the views of FIGS. 3, 4 and 6, the system or assembly 12 includes a first speaker unit 66 positioned in the first speaker compartment 60 and mounted therein to transmit sound through the first sound opening 34 and a second speaker unit 68 positioned in the second speaker compartment 62 and mounted therein to transmit sound through the second sound opening 36.

The front panel 20 is preferably formed as a unitary molded part from a thermoplastic such as a polyolefin with a talc filler in an injection molding process. In like fashion, the back panel 40 is preferably formed as a unitary molded part from a thermoplastic (such as a filled polyolefin) in an injection molding process. The front panel 20 includes attachment features 58 (FIG. 6) formed on the inner surface 22 of the front panel 20 which are joined with complimentarily formed attached features 59 (FIG. 9) formed on the inner surface 42 of the back panel 40. The attachment features 58 and 59 of the panels 20 and 40, respectively, are thermoplastic attachment features to join the panels 20 and 40 together.

Referring again to FIGS. 3, 4 and 6, the system 12 may further comprise a third speaker unit 70 positioned in the first speaker compartment 60 and a fourth speaker unit 72 positioned in the second speaker compartment 62. The first and second speaker units 66 and 68 may be bass/midrange speaker units and the third and fourth speaker units 70 and 72, respectively, may be higher frequency speaker units or tweeters.

At least one embodiment of the present invention (as shown in all of the drawing figures except FIG. 8) includes light units such as an elongated light bar 74 which is housed with a light housing 75, and a pair of relatively small light bars 76 held by a pair of light holders 77. A lens 78 is disposed at opposite ends of the back panel 40 to focus light emitted by the light bars 74 and 76.

The system 12 further includes a lighted logo unit 79 supported by the front panel 20 to emit or project light forward of the assembly 12.

The system or assembly 12 typically further includes a wiring harness (not shown) routed to each of the speaker compartments 60 and 62 to couple electrical audio signals to each of the speaker units 66, 68, 70 and 72. The wiring harness is routed to each of the light units and the logo unit 79 to couple electrical power to the light units 74 and 76, electrical power to the logo unit 79 and electrical power and control signals to a pair of spaced, powered hinge assemblies, generally indicated at 80. The wiring harness typically includes a plurality of wires. The wiring harness also typically includes a multi-pin, main connector adapted to be connected to a connector (not shown) coupled to the electrical system of the vehicle 10. The wiring harness further includes a plurality of connectors for connection to each of the speaker units 66, 68, 70 and 72, the light units 74 and 76 and the lighted logo unit 79.

Figure 7:
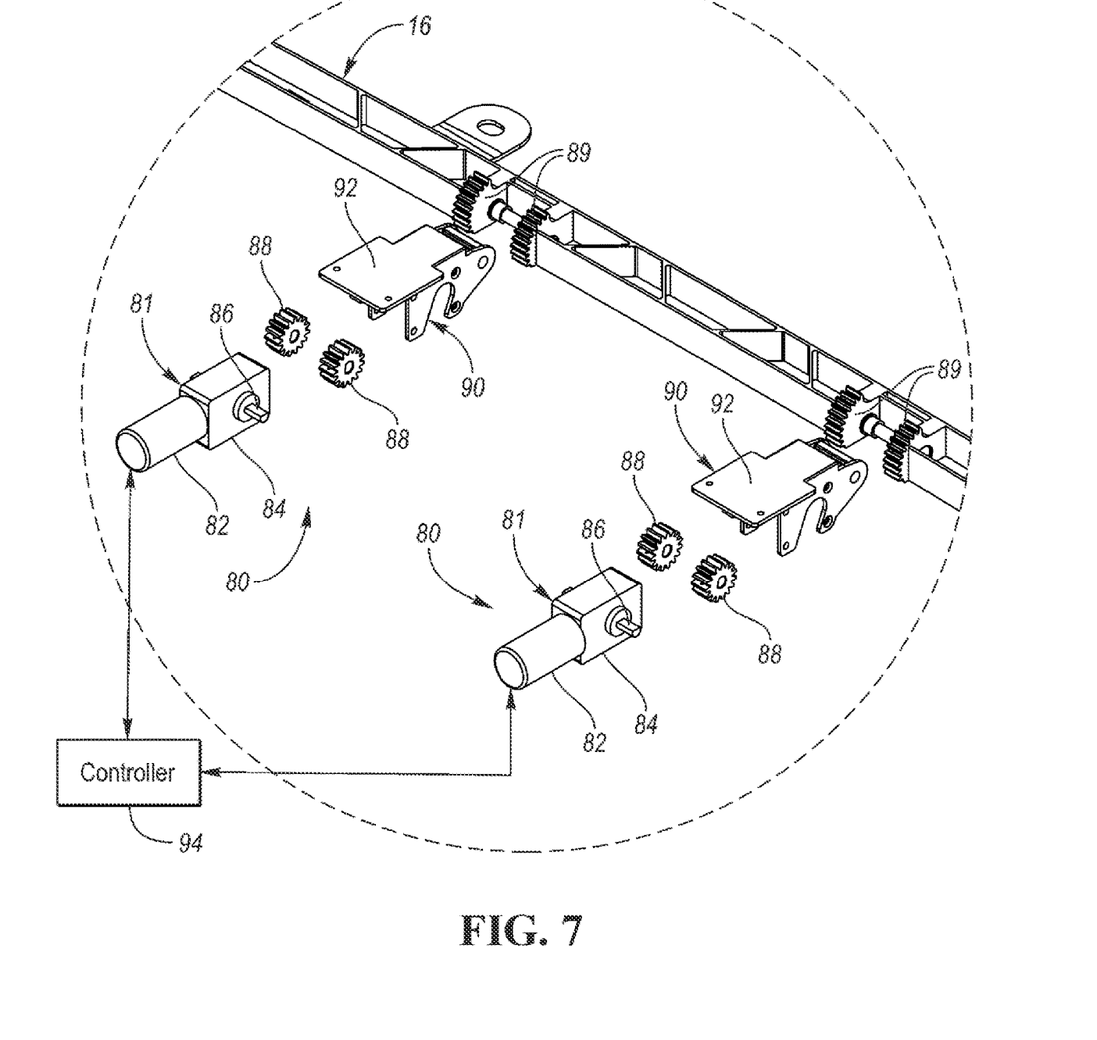
FIG. 7 is an enlarged view, taken within the dashed circle labeled "7" in FIG. 6, of a pair of powered hinge assemblies constructed in accordance with at least one embodiment of the present invention.

As best shown in FIGS. 6 and 7, each powered hinge assembly 80 hingedly connects the rest of the speaker assembly 12 to the vehicle mount 16 to allow limited swinging movement of the speaker assembly 12 between different positions on the vehicle 10. Each hinge assembly 80 includes a bidirectional, electrically-powered actuator and transmission subassembly, generally indicated at 81. Each of the actuator and transmission subassemblies 81 includes a rotary output shaft 86 and a set of interconnected transmission elements (not shown) coupled to the output shaft 86 and to the inner surface of the back panel 40 of the assembly 12 to automatically swing the speaker assembly 12 upon rotation of its output shaft 86 in a first direction from a first position to a second position based on a command signal from a motor controller 94 (FIG. 7).

Each set of interconnected transmission elements comprises a set of gears of a gear box 84 coupled to the output shaft of its motor 82 and the output shaft 86 of its subassembly 81 to rotate therewith to drive its hinge assembly 80.

Each hinge assembly 80 includes a pair of spaced apart gears 88 mounted on the output shaft 86 to rotate therewith in meshing engagement with a pair of spaced toothed guide members 89 fixedly connected to the vehicle mount 16 to guide movement of the speaker assembly 12.

Each hinge assembly 80 may be characterized as a geared hinge assembly.

Each pair of gears 88 is fixedly connected to a support bracket, generally indicated at 90, to rotate therewith. Each bracket 90 includes a flat support plate 92 which is fixedly secured to the inner surface 42 of the back panel 40 to rotate the assembly 12 when the motors 82 receive a command signal from the motor controller 94.

One or more connectors may be provided in the central compartment 64 to provide electrical power and digital data via electrical wiring (not shown) to the motors 82. Alternatively, electrical power and digital data may be provided wirelessly in any well-known fashion such as by a bus.

The assembly 12 may be electrically connected to a main controller of an electrical system of the vehicle 10. The main controller is typically electrically connected to one or more switches and/or one of more sensors so that the assembly 12 can be automatically operated to swing on the vehicle 10. For example, the main controller can be electrically connected to a button, an ignition switch, a light sensor, a headlight switch and/or an interior light switch as needed and/or desired.

The motor driver or controller 94 may be coupled to the main controller of the vehicle. The driver 94 may comprise one or more analog and/or digital electrical or electronic components, and may include a microprocessor, microcontroller, application-specific integrated circuit (ASIC), programmable logic, and/or other circuit elements. According to an exemplary embodiment, the driver 94 may be configured to receive data via one or more electrical wires or buses such as the leads from a plurality of vehicle systems within the vehicle 10. For example, the driver 94 can be configured to receive data from sensors on the vehicle 10.

In one exemplary embodiment, the motor driver 94 may be a power source and control circuitry to operate the motors 82. The driver 94 may be an LIN driver including a LIN transceiver, a LIN protocol/controller and a microcontroller (MCU).

The ECU of the vehicle 10 and the motor driver or controller 94 are typically connected via a vehicle bus such as a local interconnect network (LIN or CAN) line or bus capable of two-way communications. LIN is one of many possible in-vehicle local area network (LAN communications) protocols. A power line and a ground line may be provided between the ECU and the controller 94 (via leads). The controller 94 typically includes a transceiver interface within the MCU, a microprocessor and its control logic within the MCU, the drive or driver, and an electrical power source. The controller 94 may be integrated or physically coupled with the motors 82 in their housings, while the ECU is provided some distance away from the motor housings.

The power source or circuit of the controller 94 supplies electric power of predetermined voltage levels to the MCU through the drive or driver. The transceiver within the MCU is a communications interface circuit connected to the network or vehicle bus for communications and operates as a receiver section for the MCU and a transmitter section back to the ECU. The driver typically includes the driver circuit for driving the motors 82.

The MCU of the driver 94 typically includes a memory and may be configured as a conventional microcomputer including a CPU, a ROM, a RAM and the like or as a hardwired logic circuit.

The ECU and the controller 94 may perform data communications regularly through the LIN or CAN bus. In such data communications, the controller or driver 94 may transmit state data indicating the state of the motors 82 to the ECU.

The ECU and/or the controller 94 may confirm the desired state of the motors 82. The state of the ECU is based on various states detected by non-contact position sensor(s), commands and the present state of the motors 82 to generate command signals.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An articulated vehicle speaker system comprising:
a vehicle mount adapted to be mounted on a vehicle;
a speaker assembly including front and back injection molded panels which, when joined together, define a speaker compartment at first and second ends of the panels to house a speaker unit and a central compartment which separates the speaker compartments; and
a pair of spaced, powered hinge assemblies disposed within the central compartment to hingedly connect the speaker assembly to the vehicle mount to allow limited swinging movement of the speaker assembly between first and second positions on the vehicle wherein each hinge assembly includes a bidirectional, electrically-powered actuator and transmission subassembly, each actuator and transmission subassembly including a rotary output shaft and a set of interconnected transmission elements coupled to the output shaft and to the speaker assembly to automatically swing the speaker assembly upon rotation of its output shaft in a first direction from the first position to the second position based on a command signal.

2. The system as claimed in claim 1, wherein each set of interconnected transmission elements comprises a set of gears coupled to its output shaft to rotate therewith.

3. The system as claimed in claim 2, wherein each hinge assembly includes a pair of spaced apart gears mounted on the output shaft to rotate therewith in meshing engagement with a pair of toothed guide member fixedly connected to the vehicle mount to a guide movement of the speaker assembly.

4. The system as claimed in claim 2, wherein each hinge assembly comprises a geared hinge assembly.

5. The system as claimed in claim 1, wherein the vehicle is a sport utility vehicle and wherein the system is an overhead sound bar assembly.

6. The system as claimed in claim 1, wherein each actuator and transmission subassembly includes a DC motor responsive to the command signal.

7. An articulated vehicle speaker system having a plurality of speaker units, the system comprising:

a vehicle mount adapted to be mounted on a vehicle;

a speaker assembly including front and back injection molded panels which, when joined together, define a speaker compartment at first and second ends of the panels and a central compartment which separates the speaker compartments, the front panel having a first sound opening at the first end and a second sound opening at the second end;

a first speaker unit disposed in the first speaker compartment and mounted to transmit sound through the first sound opening and a second speaker unit disposed in the second speaker compartment and mounted to transmit sound through the second sound opening; and a pair of spaced, powered hinge assemblies disposed within the central compartment to hingedly connect the speaker assembly to the vehicle mount to allow limited swinging movement of the speaker assembly between first and second positions on the vehicle wherein each hinge assembly includes a bidirectional, electrically-powered actuator and transmission subassembly, each actuator and transmission subassembly including a rotary output shaft and a set of interconnected transmission elements coupled to the output shaft and to the speaker assembly to automatically swing the speaker assembly upon rotation of its output shaft in a first direction from the first position to the second position based on a command signal.

8. The system as claimed in claim 7, wherein each set of interconnected transmission elements comprises a set of gears coupled to its output shaft to rotate therewith.

9. The system as claimed in claim 8, wherein each hinge assembly includes a pair of spaced apart gears mounted on the output shaft to rotate therewith in meshing engagement with a pair of toothed guide members fixedly connected to the vehicle mount to guide movement of the speaker assembly.

10. The system as claimed in claim 8, wherein each hinge assembly comprises a geared hinge assembly.

11. The system as claimed in claim 7, wherein the vehicle is a sport utility vehicle and wherein the system is an overhead sound bar assembly.

12. The system as claimed in claim 7, wherein each actuator and transmission subassembly includes a DC motor responsive to the command signal.

* * * * *